US006529318B1

(12) United States Patent
Kaneda et al.

(10) Patent No.: US 6,529,318 B1
(45) Date of Patent: Mar. 4, 2003

(54) TOTAL INTERNAL REFLECTION (TIR) COUPLER AND METHOD FOR SIDE-COUPLING PUMP LIGHT INTO A FIBER

(75) Inventors: Yushi Kaneda, Tucson, AZ (US); Sergio Brito Mendes, Tucson, AZ (US); Shibin Jiang, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 27 days.

(21) Appl. No.: 09/943,257

(22) Filed: Aug. 30, 2001

(51) Int. Cl.$^7$ ............................. H01S 3/00; H01S 3/091
(52) U.S. Cl. ..................................... 359/341.32; 372/70
(58) Field of Search ........................ 359/341.3, 341.32; 372/6, 70

(56) References Cited

U.S. PATENT DOCUMENTS

| | | |
|---|---|---|
| 3,610,727 A | 10/1971 | Ulrich |
| 3,674,335 A | 7/1972 | Ashkin et al. |
| 4,871,224 A | 10/1989 | Karstensen et al. |
| 5,048,026 A | 9/1991 | Shaw et al. |
| 5,119,452 A | 6/1992 | Yokomori et al. |
| 5,121,457 A | 6/1992 | Foley et al. |
| 5,125,053 A | 6/1992 | Abe et al. |
| 5,854,865 A | 12/1998 | Goldberg |
| 5,923,694 A | 7/1999 | Culver |
| 6,052,220 A | 4/2000 | Lawrence et al. |
| 6,094,515 A | 7/2000 | Miki et al. |
| 6,236,793 B1 | 5/2001 | Lawrence et al. |
| 6,243,515 B1 | 6/2001 | Heflinger et al. |
| 6,407,852 B1 * | 6/2002 | Lange et al. ................ 359/333 |
| 6,456,637 B1 * | 9/2002 | Holcomb et al. ............. 372/40 |

OTHER PUBLICATIONS

Th. Weber et al., A longitudinal and side–pumped transverse mode double–clad fiber laser with a special silicone coating, Optics Communications, Mar. 1, 1995, pp. 99–104, No. 115, Elsevier Science B.V.

Lew Goldberg et al., Highly efficient 4–W Yb–doped fiber amplifier pumped by a broad–stripe laser diode, Optics Letters, May 15, 1999, pp. 673–675, vol. 24, No. 10, Optical Society of America.

Jeffrey P. Koplow et al., Compact 1–W Yb–Doped Double–Cladding Fiber Amplifier Using V–Groove Side–Pumping, IEEE Photonics Technology Letters, Jun. 6, 1998, pp. 793–795, vol. 10, No. 6.

L. Goldberg et al., V–groove side–pumped 1.5–um fiber amplifier, CLEO '96, pp. 208–209.

L. Goldberg et al., V–groove side–pumped 1.5 um fibre amplifier, Electronics Letters, Dec. 4, 1997, pp. 2127–2129, vol. 33, No. 25.

* cited by examiner

Primary Examiner—Mark Hellner
(74) Attorney, Agent, or Firm—Eric A. Gifford

(57) ABSTRACT

A total internal reflection (TIR) coupler for side coupling pump light into a fiber for use in an amplifier or laser is mounted on a flat surface of the fiber's inner cladding. The TIR coupler has a reflecting surface that forms an angle of taper a with the inner cladding, which is effective to reflect pump light at a preselected angle of incidence $\theta_{inc}$ and satisfy a TIR condition at its reflecting surface for folding pump light into the fiber. The pump light is launched into the fiber at an angle that also satisfies a TIR condition for guiding pump light inside the inner cladding.

48 Claims, 15 Drawing Sheets

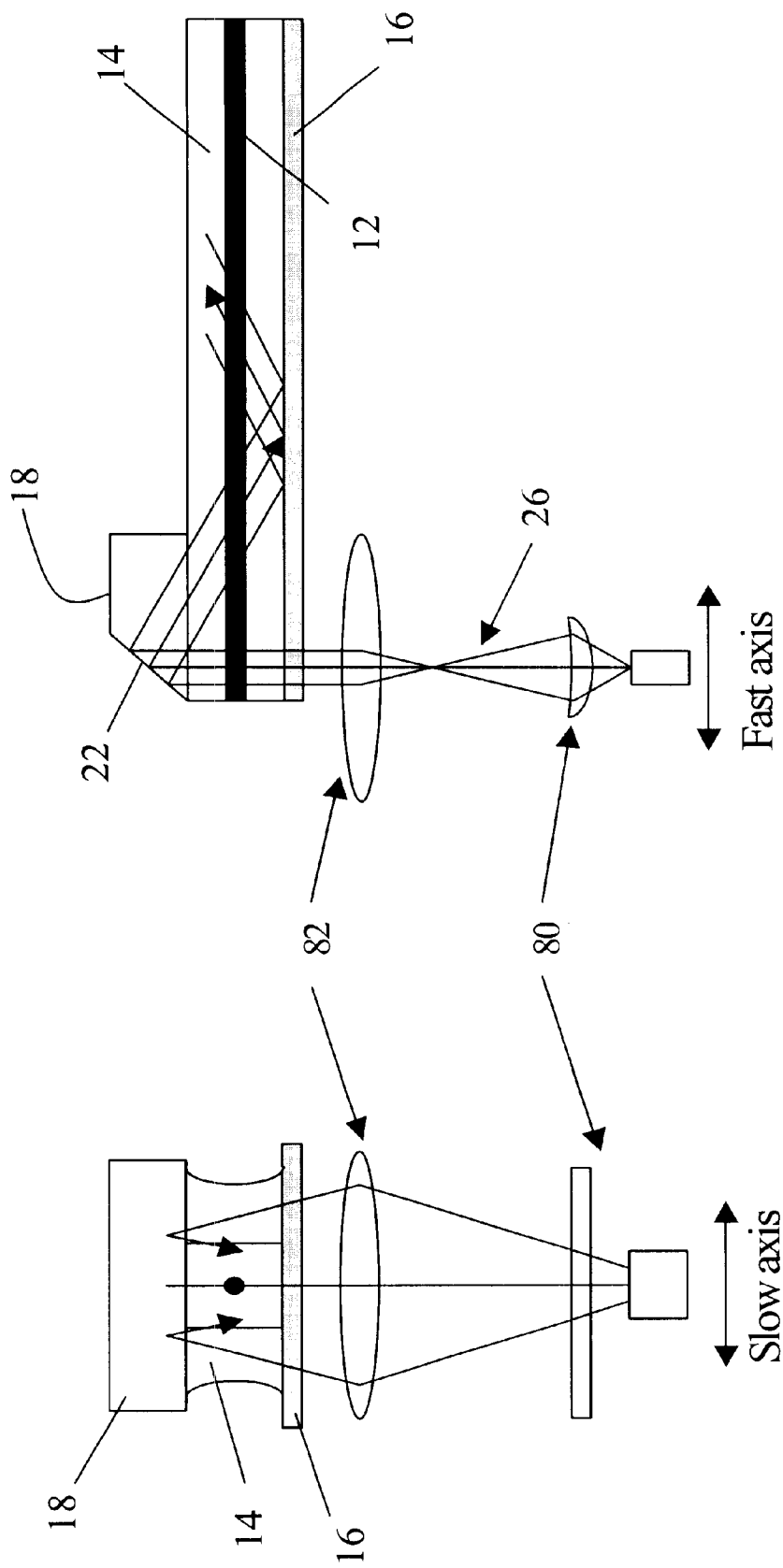

TOTAL INTERNAL REFLECTION (TIR) COUPLER AND METHOD FOR SIDE-COUPLING PUMP LIGHT INTO A FIBER

BACKGROUND OF THE INVENTION

1. Field of the Invention.

This invention relates generally to a total internal reflection (TIR) coupler for side coupling pump light into an optical fiber.

2. Description of the Related Art

Fiber amplifiers and fiber lasers require high optical pump levels to be injected within the region of the fiber that includes the active medium that provides the optical gain. Presently, the output power from fiber amplifiers and fiber lasers is limited by the amount of optical power that can be injected into the active medium of the fiber. This limitation stems from the approaches that have been used in the past to couple optical pump power into the fiber.

In the case of single-mode doped fiber, wavelength division multiplexing (WDM) couplers are typically used. The WDM coupler is connected between the telecom fiber and the single-mode doped fiber. Such an interruption complicates the pumping process.

In the case of dual clad doped fiber, a common approach for injecting optical pump power is end pumping. End pumping provides at most only two input ends through which all the injected optical pump power enters the fiber. This physically constrains the number and type of pump sources that can be used to inject the optical power. Such a constraint has led to the development of optical side pumping techniques for dual clad doped fiber in which the entire length of the fiber is made available to couple in a much greater number and type of optical pump sources.

Accordingly, side coupling pump light into a doped fiber has been performed in the past. As previously described, the use of WDM allows pump light having a different wavelength from that which is to be amplified to be coupled into the doped fiber at any point along the fiber provided that an interruption is made for the WDM coupler in the doped fiber. The WDM coupler is designed so that pump light is sent into one of the two input fibers and the light to be amplified is sent into the other input fiber. The interaction length between the two closely coupled fibers is precisely selected to enable the pump light to be completely coupled to the fiber with the light to be amplified while the light to be amplified remains in the same fiber. This is relatively complex.

U.S. Pat. No. 5,854,865 to Goldberg teaches that a second method for side coupling pump light is to cut V-grooves into the cladding of dual clad doped fiber. The V-grooves bounce the side-coupled light into a mode of propagation along the fiber. Although quite efficient (>90%), the cutting of the V-grooves, however, generally weakens the fiber, and is a complicated and expensive process.

Prism couplers are used to couple light into a dual clad doped fiber. The most common technique is to direct pump light into a prism positioned next to the cladding and rely on the evanescent field properties to couple light into the cladding. To achieve coupling efficiencies of 50–60% the spacing between the prism and the cladding must be precisely controlled. Representative evanescent prism coupling schemes are disclosed in U.S. Pat. Nos. 3,610,727 and 5,119,452.

Weber et al. "A longitudinal and side-pumped single transverse mode double-clad fiber laser with a special silicone coating" Optics Communications 115 (1995) pp. 99–104 teaches placing the prism on a special silicone coating around a conventional circular clad fiber. Simple refraction is used to couple light into the prism and then into the fiber cladding. In this configuration, the angle of incidence at the air-prism interface is relatively large. An AR coating would have to be a multi-layer coating, which reduces transmission and increases cost. Operation at the Brewster angle eliminates the need for the AR coating but necessitates the use of a single transverse mode pump laser to get high transmission efficiency. Further, using simple refraction the angle of the pump light with respect to the fiber is relatively shallow. Therefore, to clear the path for the fiber, the pump and focusing lens must be relatively far away from the prism and the diameter of the focusing lens must be small. This also dictates the use of a single mode pump laser such as the Ti: Sapphire laser described in their paper.

U.S. Pat. No. 6,243,515 to Heflinger discloses a technique to side-couple light using a grating formed on a multimode fiber. The grating diffracts a beam of pump light at an angle that is matched to the angle characterizing a propagating mode. As shown in FIG. 7 of Heflinger's patent, the diffracted beam can be first passed to a tapered fusion coupler, which directs the beam into the dual-clad fiber. The inclusion of a grating provides sub-optimal coupling efficiency and can be difficult to manufacture.

The industry has an unfulfilled need for a coupler, which is simple to construct, inexpensive, mechanically robust and provides coupling efficiencies even better than those provided by Goldberg's V-groove.

SUMMARY OF THE INVENTION

In view of the above problems, the present invention provides a robust low-cost technique for efficiently side-coupling pump light into an optical fiber, which is particularly applicable to ultra-short optical amplifiers and lasers using multi-component glasses.

This is accomplished by bonding a TIR coupler in optical contact to the fiber's inner cladding. The inner cladding, which surrounds a core, has at least one flat surface and is transparent to the pump wavelength. A source of pump radiation directs a beam of pump light into the TIR coupler from either the front or backside of the fiber, which is mounted on a substrate. The beam is preferably oriented substantially normal to the fiber to simplify packaging, facilitate the use of a multi-mode pump source and simplify the design of any anti-reflection (AR) coatings.

The TIR coupler has an angle of taper a and a length L such the principal ray of the pump light is reflected at an angle that satisfies the total internal reflection (TIR) condition at the coupler's reflecting surface, and input and output coupling conditions, to efficiently "fold" the light into the fiber and satisfies the TIR condition inside the fiber to "guide" the light down the fiber's inner cladding. The angle of incidence is preferably such that substantially all of the pump light (principal and marginal rays) satisfies the TIR condition. The pump light is preferably focused to obtain such high coupling efficiencies and to confine the light within a narrow cladding, which produces higher power density.

Once coupled into the fiber, the pump light excites an active media thereby producing gain to either amplify an optical signal propagating through the core or satisfy the lasing condition to create an optical signal in the core. In one embodiment, the coupler directs pump light into the inner cladding surrounding an active media in the core, e.g. a coupler mounted on an active fiber. In another embodiment, the coupler directs pump light into a passive (undoped) section of the fiber, which in turn couples the pump light into the inner cladding surrounding the active media, e.g. a coupler mounted on a passive fiber that is optically coupled to an active fiber. This latter configuration provides significant advantages in devices that require ultra-short active gain medias such as amplifier chips or single-mode lasers and specifically those that use multi-component glasses highly doped with rare-earth ions to provide high gain per unit length.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 4a and 4b illustrate the pump coupling optics along the slow and fast axis, respectively;

DETAILED DESCRIPTION OF THE INVENTION

Figure 1A:
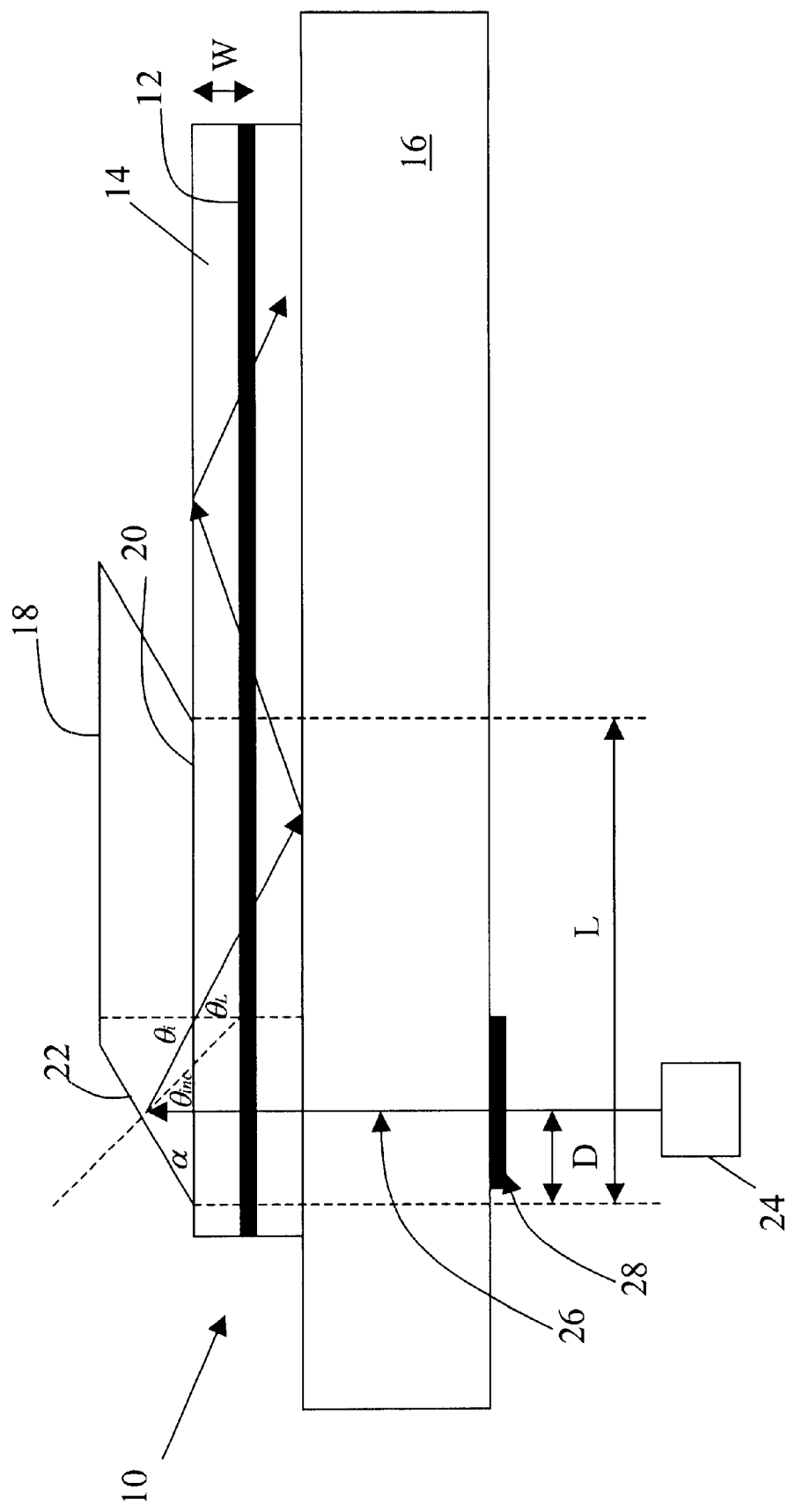
FIGS. 1a and 1b are sectional views of a fiber formed with a TIR coupler configured for backside and front side pumping, respectively, in accordance with the present invention.

The present invention provides a robust low-cost technique for efficiently side-coupling pump light into an optical fiber, which is particularly applicable to ultra-short optical amplifiers and lasers that use multi-component glasses. This is accomplished with a TIR coupler having an angle of taper α, a length L and a refractive index $n_{coupler}$ Pump light injected into the coupler undergoes total internal reflection such that substantially all of the light is folded into the fiber and guided down the fiber's inner cladding.

In order for this to occur, the coupler and, more specifically, taper angle α and length L must be selected to satisfy certain constraint equations to achieve total internal reflection (TIR) at the coupler's reflecting surface and inside the fiber and to input couple substantially all of the pump light reflected by the taper into the fiber without output coupling a significant amount of the pump light.

The TIR condition at the coupler's reflecting surface is given by:

$$\theta_{inc} > \arcsin\left(\frac{1}{n_{coupler}}\right) \quad (1)$$

where $\theta_{inc}$ is the angle of incidence of the pump light with respect to the reflecting surface, e.g. the angle measured from the normal to the reflecting surface to principal ray of the incident light, $n_{coupler}$ is the refractive index of the coupler and the surrounding media is air. The smallest angle of incidence that satisfies eqn. 1 is termed the critical angle for the TIR condition. The angle of taper α is equal to the angle of incidence provided that the pump light is oriented normal to the fiber; above, below or to the side of the fiber. As will be discussed in detail below, a substantially normal orientation of the beam of pump light to the fiber is preferable for reasons of packaging, pump source selection and AR coating requirements.

The TIR condition inside the fiber is given by:

$$\theta_L > \arcsin\left(\frac{n_{ext}}{n_{clad}}\right) \quad (2)$$

where $\theta_L$ is the launch angle of the pump light into the fiber, $n_{clad}$ is the refractive index of the fiber's inner cladding, and $n_{ext}$ is the refractive index of the outer cladding, e.g. an outer cladding layer or possibly air. The smallest launch angle that satisfies eqn. 2 is termed the critical angle for the TIR condition.

The input coupling condition to efficiently input couple the light reflected off of the TIR coupler's reflecting into the fiber is given by:

$$\frac{|D|}{\cos\theta_i} < L \quad (3)$$

where |D| is the lateral distance from the starting point of the taper to the point where the beam of pump light strikes the reflecting surface as projected onto the fiber where |●| is the absolute value operation and $\theta_i$ is the angle of incidence at the coupler-fiber interface and is dictated by the geometry of the taper and the angle of incidence at the air-coupler interface. In many cases, the coupler and inner cladding are index matched, in which case the launch and incidence angles at the coupler-fiber interface are the same.

The output coupling condition to avoid output coupling of light reflected off of the inside of the fiber is given by:

$$L < \frac{|D|}{\cos\theta_i} + 2\,W\tan\theta_L \quad (4)$$

where W is the diameter of the inner cladding. For simplicity, equations 3 and 4 assume a beam width of zero. A more general case will be presented with reference to FIGS. 5a and 5b.

The proper selection of taper angle α and length L and positioning of the pump source to provide a sufficiently large angle of incidence will result in substantially all of the pump light being coupled into the fiber. Typically the angle of incidence is thought of as the angle between the surface normal and the primary ray. However, a pump beam has a finite cross section that consists of multiple angular components known as marginal rays. Thus, a configuration in which the principal ray just satisfies the TIR condition may not capture all of the marginal rays. Therefore, the angle of incidence is preferably sufficiently larger, e.g. a couple of degrees, than the critical angle given in equation 1 to ensure that substantially all of the light is coupled into the fiber. Furthermore, the beam is preferably focused to confine the beam within a narrow cladding, which has the desired effect of improving power density inside the fiber.

Figure 1B:
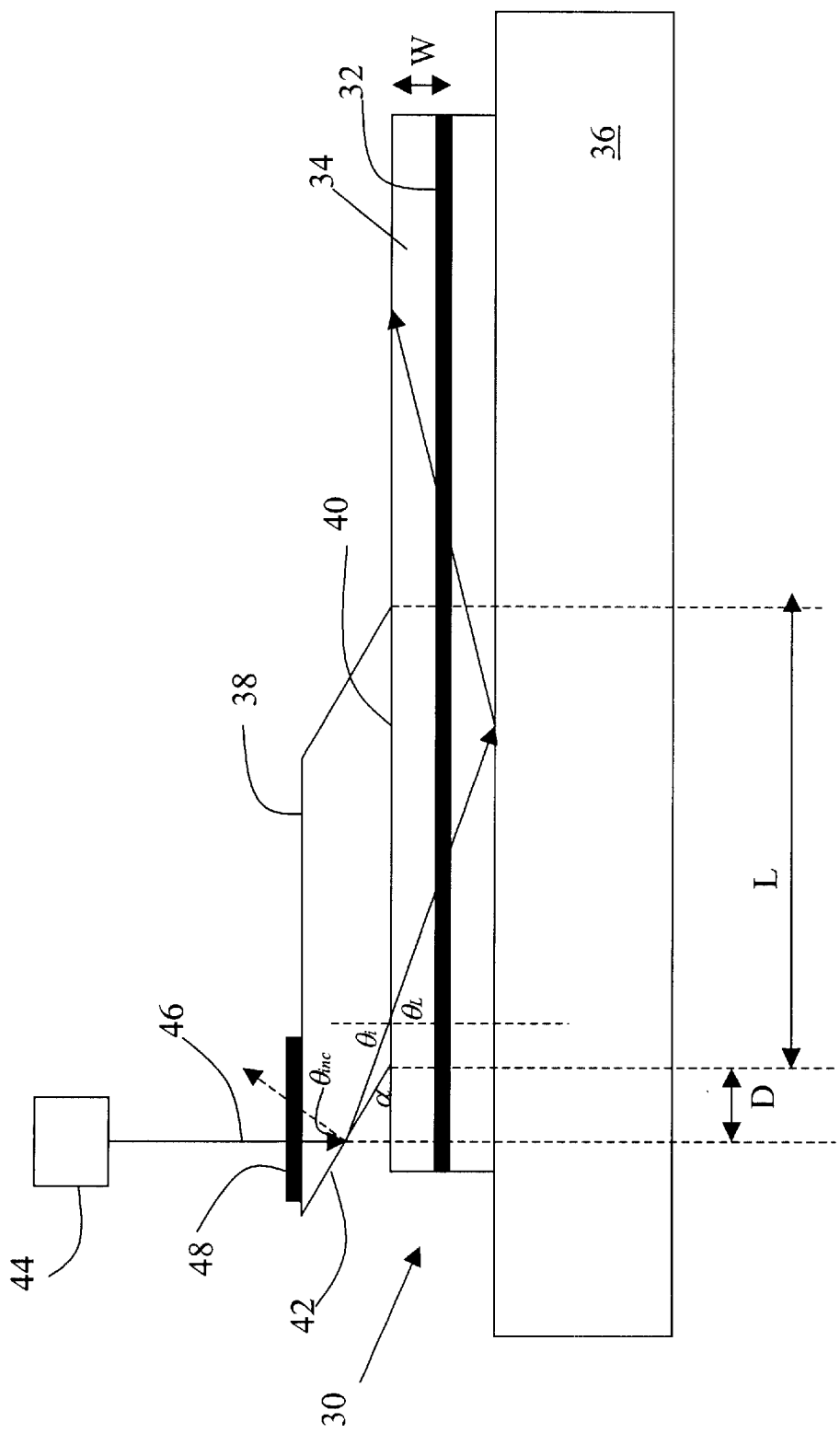

As shown in FIGS. 1a and 1b the pump light can be coupled from the backside of the fiber through the substrate or from the front side, each having distinct advantages.

In the backside configuration shown in FIG. 1a, a fiber comprising a core 12 and an inner cladding 14 is mounted on a substrate 16. A TIR coupler 18 is bonded in optical contact to a flat surface 20 on inner cladding 14 for length L. TIR coupler 18 has a reflecting surface 22 that forms an interior angle of taper α with respect to surface 20. A pump source 24 is positioned on the backside of substrate 16 so that a beam of pump light 26 is substantially normal to the fiber. In this example, the coupler and inner cladding are index matched ($n_{clad} = n_{coupler}$) and the outer cladding is air. From Snell's law $n_{coupler} \sin\theta_i = n_{clad} \sin\theta_L$, hence $\theta_i = \theta_L$. Pump light 26 passes through substrate 16, reflects off surface 22 and is folded into the fiber 10 if the following constrain equations are satisfied:

$$\frac{\theta_i}{2} > \arcsin\left(\frac{1}{n_{coupler}}\right) \quad (5)$$

$$\theta_L > \arcsin\left(\frac{n_{ext}}{n_{clad}}\right) \quad (6)$$

$$\frac{|D|}{\cos\theta_i} < L < \frac{|D|}{\cos\theta_i} + 2\,W\tan\theta_L \quad (7)$$

where the angle of incidence $\theta_{inc}$ and angle of taper α are equal to $\theta_i/2$ for a pump source that is oriented normal to the fiber.

It is generally preferred to form an AR coating 28 on substrate 16. Since the angle of incidence of the pump light 26 with respect to AR coating 28 is substantially zero in the preferred normal orientation, the AR coating can be a very inexpensive single-layer coating with transmission in excess of 99%. Omission of the AR coating reduces transmission efficiency by about 4%.

In the front side configuration shown in FIG. 1b, a fiber 30 comprising a core 32 and an inner cladding 34 is mounted on a substrate 36. A TIR coupler 38 is bonded in optical contact to a flat surface 40 on inner cladding 34 for length L. TIR coupler 38 has a reflecting surface 42 that forms an exterior angle of taper α with respect to surface 40. A pump source 44 is positioned on the front side of substrate 36 so that a beam of pump light 46 is substantially normal to the fiber. In this example, the coupler and inner cladding are index matched and the external media is air. Pump light 46 reflects off surface 42 and is coupled into fiber 30 if the following constrain equations are satisfied:

$$\frac{\pi - \theta_i}{2} > \arcsin\left(\frac{1}{n_{coupler}}\right) \quad (8)$$

$$\theta_L > \arcsin\left(\frac{n_{ext}}{n_{clad}}\right) \quad (9)$$

$$\frac{|D|}{\cos\theta_i} < L < \frac{|D|}{\cos\theta_i} + 2\,W\tan\theta_L \quad (10)$$

where the angle of incidence $\theta_{inc}$ and angle of taper α are equal to $(\pi-\theta_i)/2$ for a pump source that is oriented normal to the fiber. Note that in this front side configuration the distance D is less than zero.

It is generally preferred to form an AR coating 48 on coupler 38. Since the angle of incidence of the pump light 46 with respect to AR coating 48 is substantially zero in the preferred normal orientation, the AR coating can be a very inexpensive single-layer coating with transmission in excess of 99%.

The purpose of coupling pump light into the inner cladding of the fiber is to excite a gain media, e.g. the doped core, causing stimulated emission, hence gain. As depicted in FIGS. 1a and 1b, cores 12 and 32 are doped to provide the gain media so that the coupler folds pump light. directly into the gain media. This approach has the advantage of being compact with minimal components. However, the portion of the core that lies directly beneath the coupler's reflecting surface is not illuminated with pump light, hence not excited. Gain media that is not excited actually absorbs energy, which reduces the overall gain and effectively degrades noise figure performance. Due to their relative geometries (larger angle of incidence), the unexcited region in the front side configuration will be larger than its counterpart in the backside configuration. If other considerations such as size dictate placing the coupler on the active fiber than the backside approach may be favorable. However, backside pumping does have certain disadvantages. First, the pump light must pass through the substrate, which is substantially transparent to the pump wavelength, and, more importantly, pass through the adhesive that holds the fiber to the substrate. This causes reliability problems due to the degradation of the adhesive under strong illumination of the pump source. Second, the angle of incidence at the reflecting surface for backside pumping is smaller than that for front side pumping. As discussed above, a large angle of incidence is preferable to couple substantially all of the light including those marginal rays whose angle of incidence is less than that of the principle ray into the fiber. Third, the working distance from the pump optics to the TIR coupler is longer.

Figure 2:
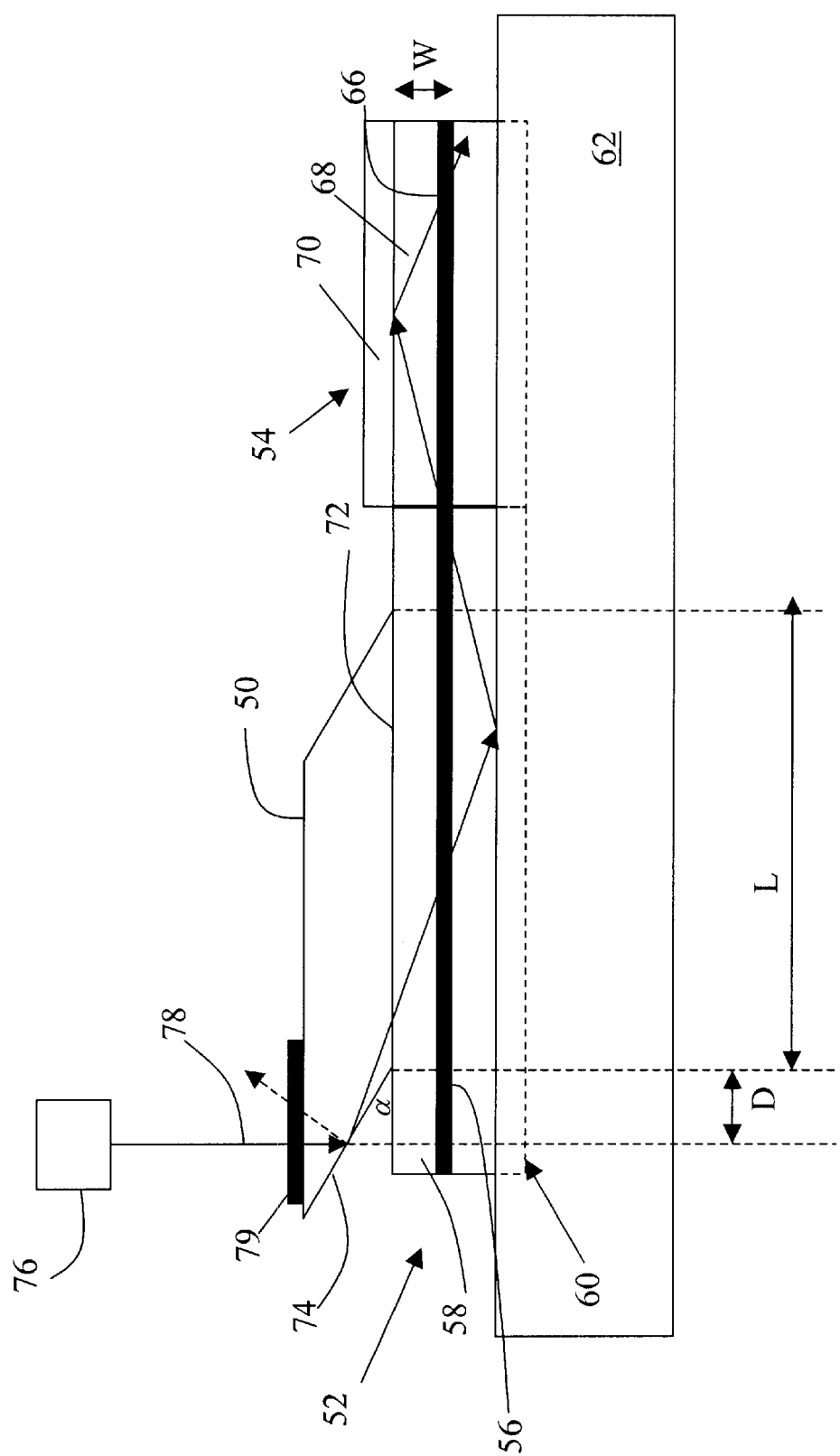
FIG. 2 is a sectional view of an active gain media in which the TIR coupler is mounted on a passive fiber that is optically coupled to an active fiber.

As shown in FIG. 2, the benefits provided by front side pumping can be realized and the problem of unexcited regions avoided by mounting a TIR coupler 50 on a passive section of fiber 52, which is optically coupled to an active fiber 54. Passive fiber 52 comprises an undoped core 56, an inner cladding 58 and a partial outer cladding 60 and is mounted on a substrate 62. Active fiber 54 comprises a doped core 66, an inner cladding 68 and an outer cladding 70 and is also mounted on substrate 62. TIR coupler 50 is bonded in optical contact to a flat surface 72 on the passive fiber's inner cladding 58 for length L.

TIR coupler 50 has a reflecting surface 74 that forms an exterior angle of taper α with respect to surface 72. In this example, and as will typically be the case, the cores and inner claddings of the passive and active fibers are substantially matched in both refractive index and cross-section. A pump source 76 is positioned on the front side of substrate 62 so that a beam of pump light 78 is substantially normal to the fiber. Pump light 78 passes through AR coating 79, reflects off surface 74 and is folded into passive fiber 52, which in turn guides the pump light into active fiber 54 thereby exciting the entire length of doped core 66 in the active fiber. Because the inner claddings are index matched, the constraint equations are given by equations 8–10 above where $n_{ext}$ is the refractive index of the active fiber's outer cladding 70. If the fibers' are not index matched, the passive fiber should be configured to have a larger critical angle, i.e. a smaller acceptance angle, so that any pump light that is folded into the passive fiber and satisfies its TIR condition will also satisfy the active fiber's TIR condition. In this case, the active fiber parameters will determine constraint equations 6 and 9 regarding the TIR condition inside the fiber.

In typical amplifier and laser applications that use tens of meters of silica fibers the cost in degraded performance of a few millimeters of unexcited fiber may be negligible and not worth the expense of an additional passive component and fiber coupling. Conversely, in amplifier and laser applications that use only a few centimeters of highly doped multi-component glass fiber a few millimeters may be critical as will be discussed with reference to FIGS. 9 and 10 below.

Figure 3C:
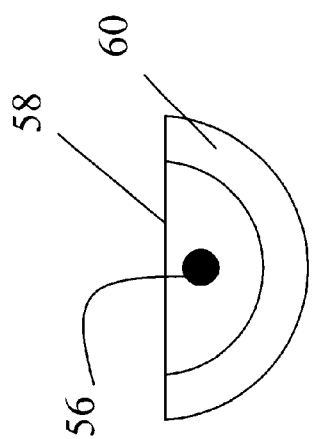
FIGS. 3a through 3c are cross-sectional views of representative passive fibers.
Figure 3B:
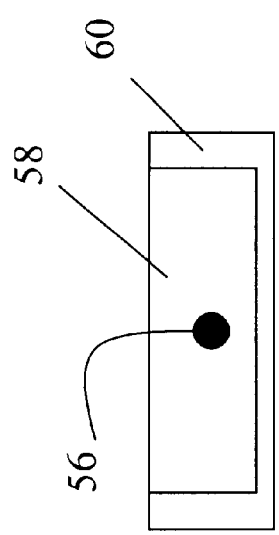
Figure 3A:
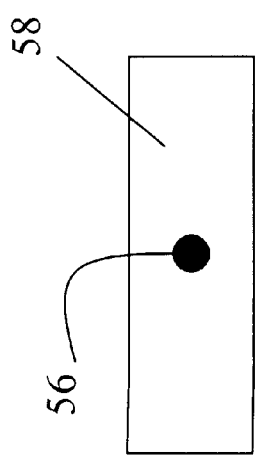

As illustrated in FIGS. 3a through 3c, passive fiber 52 can have a number of different configurations that provide a flat surface 72 for bonding the TIR coupler 50 directly to the inner cladding 58 of the fiber. Bonding can be achieved using thermal fusion or other inorganic bonding techniques. As shown in FIG. 3a core 56 is embedded in a rectangular inner cladding 58 with air providing the outer cladding 60. A partial outer cladding 60 can be formed around three sides of the inner cladding as shown in FIG. 3b. A similar configuration can be provided with a D-fiber as shown in FIG. 3c.

In FIGS. 1 and 2 pump light was represented by the single principle ray. As discussed above, however, the pump light is actually a beam of light having a finite width d and multiple angular components. FIGS. 4a and 4b illustrate the pump optics used to either collimate the beam (as shown in detail in FIGS. 5a and 5b) or focus the beam into the aperture of fiber (as shown in detail in FIGS. 6a and 6b).

The pump is characterized by fast and slow axes in which the fast axis refers to the orientation that is perpendicular to the junction of the laser diode while the slow axis is the orientation that is perpendicular to both the fast axis and the direction of the beam. The "fast" and "slow" axes are so labeled because the beam diverges more quickly in the fast axis. In a multi-mode laser, the output beam is diffraction limited in the fast axis but not in the slow axis. The optics image the laser emitter onto the fiber where the beam enters along the slow axis and collimates or gently focuses the beam along the fast axis. More specifically, the pump'source emits a divergent beam. Cylindrical lens 80 focuses the beam along its fast axis and spherical lens 82 focuses the beam along its slow axis and collimates it along the fast axis.

Figure 5A:
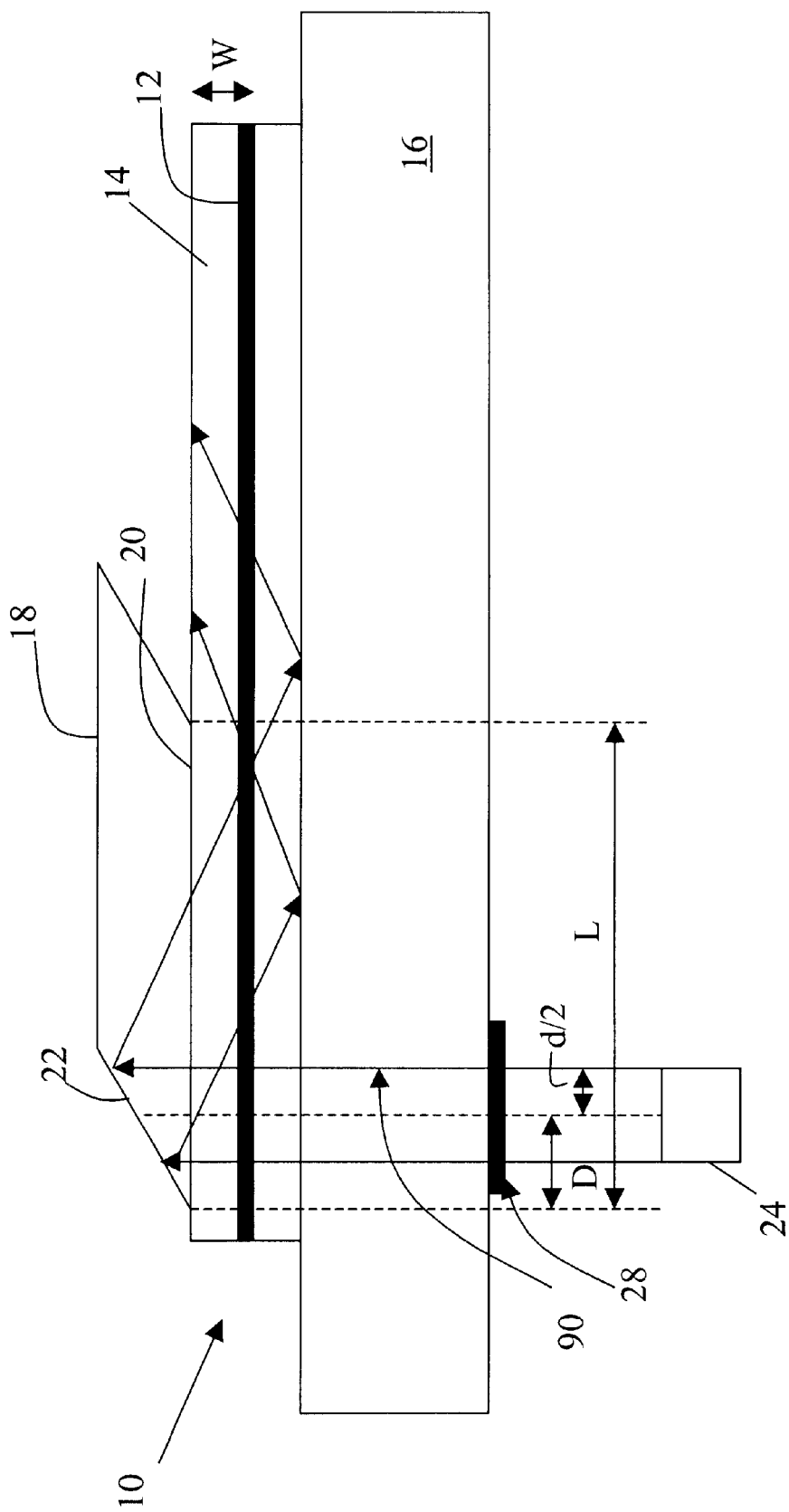
FIGS. 5a and 5b illustrate collimated pump beams having a finite beam width for back and front side pump, respectively.
Figure 5B:
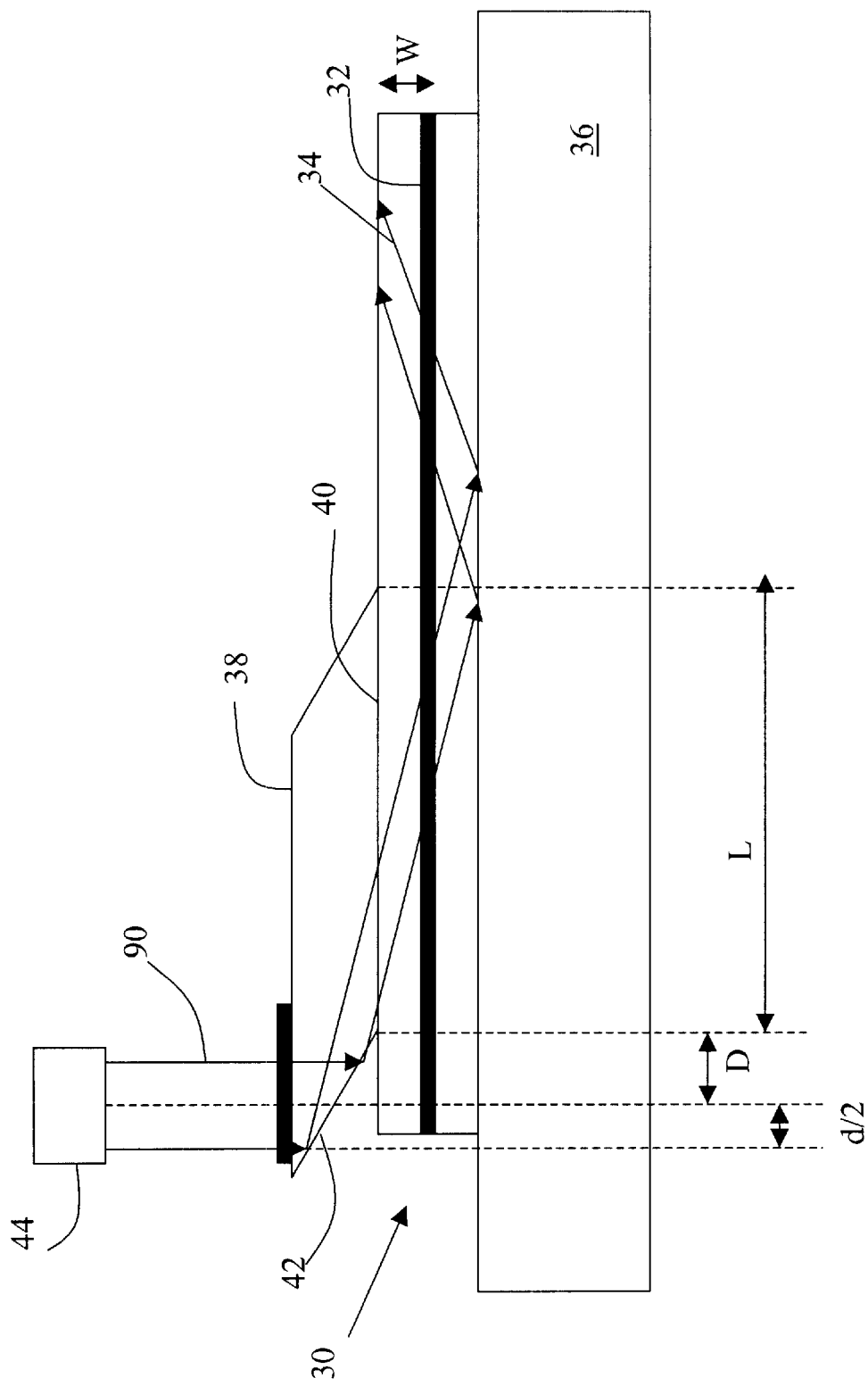

As shown in FIGS. 5a and 5b, the finite width d of the beam 90 further tightens the constraint equations regarding the length L of the TIR coupler. The length must be simultaneously longer to ensure that the beam is folded into the fiber and shorter to ensure that none of the beam is coupled back out of the fiber. This in turn affects the angle of taper and the angle of incidence at the air-coupler interface that satisfy the overall constraints.

Assuming a substantially collimated beam the modified constraint equations for the back side pumped configuration shown in FIG. 5a are given by:

$$\frac{\theta_i}{2} > \arcsin\left(\frac{1}{n_{coupler}}\right) \quad (11)$$

$$\theta_L > \arcsin\left(\frac{n_{ext}}{n_{clad}}\right) \quad (12)$$

$$\frac{(|D| + d/2)}{\cos\theta_i} < L < \frac{(|D| - d/2)}{\cos\theta_i} + 2\,W\tan\theta_L \quad (13)$$

$$d_{max} = 2W\tan\theta_L \cos\theta_i \quad (14)$$

Where $d_{max}$ is the maximum beam diameter for d for which constraint equation 13 can be satisfied.

Assuming a substantially collimated beam the modified constraint equations for the front side pumped configuration shown in FIG. 5b are given by:

$$\frac{\pi - \theta_i}{2} > \arcsin\left(\frac{1}{n_{coupler}}\right) \quad (15)$$

$$\theta_L > \arcsin\left(\frac{n_{ext}}{n_{clad}}\right) \quad (16)$$

$$\frac{(|D| + d/2)}{\cos\theta_i} < L < \frac{(|D| - d/2)}{\cos\theta_i} + 2\,W\tan\theta_L \quad (17)$$

Figure 6A:
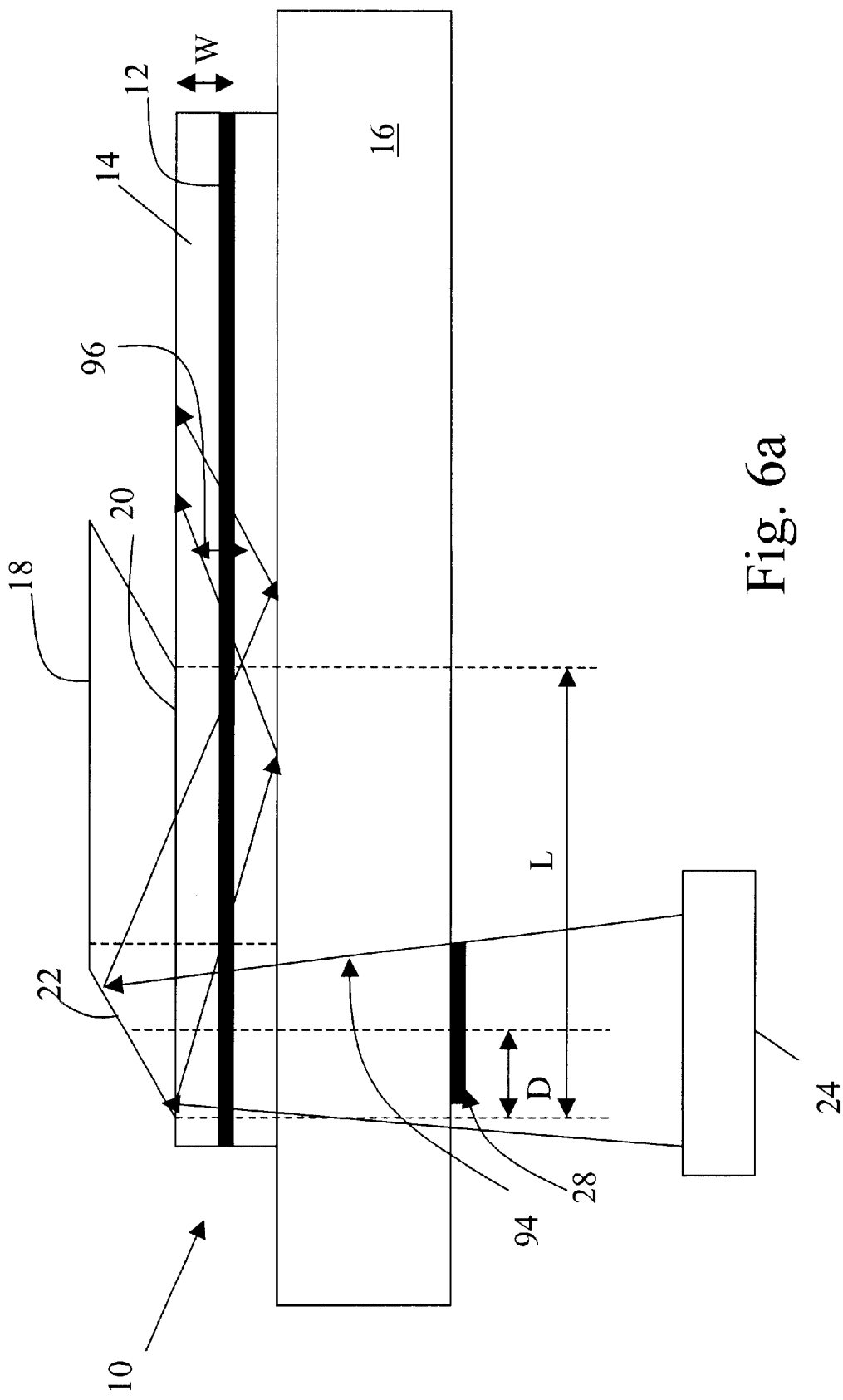
FIGS. 6a and 6b illustrate focused pump beams having a finite beam width for back and front side pump, respectively.
Figure 6B:
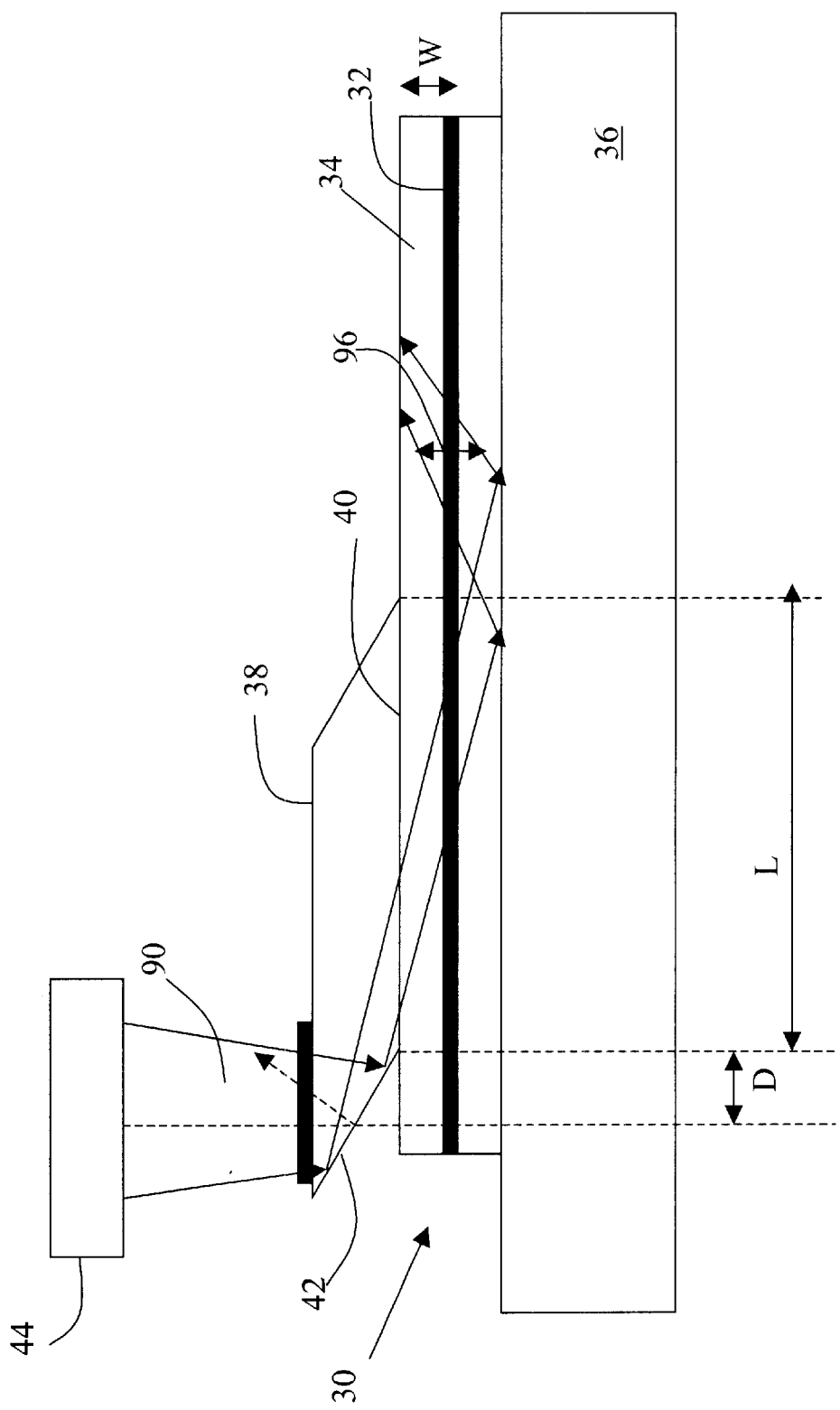

In many instances, it may be preferable to focus the beam to a small beam waist, e.g. 80×50 microns², at the aperture of the fiber to both ensure coupling of substantially all of the angular components of the beam into the fiber and to couple the-beam into a smaller cladding diameter. A smaller inner cladding means a higher power density, which translates into more efficient excitation of the doped core. FIGS. 6a and 6b illustrate an optical configuration in which the pump beam 94 is focused to a beam waist 96 at the fiber aperture for back and front side pumping, respectively. The focused beam must still satisfy constraint equations 11–14 and 15–18.

An example of a TIR coupler design that combines many of the discussed features and constraints is one in which the TIR coupler is mounted on a passive fiber, which is coupled to an active fiber. Pump light is injected from the front side and focused into the fiber aperture. In one specific implementation the passive and active fibers are double-clad fibers. The numerical aperture (NA) of their inner cladding is 0.22, so the acceptance half angle is 12 degrees. Thus, the launching angle needs to be greater than 78 degrees. The diameter of the inner clad is 90 microns, while the outer diameter of the fiber is the same as the standard telecom fiber, 125 microns. The fiber core is compatible with standard telecom fiber, single-mode at NA~0.13. A section of the passive fiber is polished down on one side, by 42.5 microns, or 20 microns from the center, to expose a flat surface, approximately 80 microns, on the inner cladding for mounting the TIR coupler.

The material for the TIR coupler is fused silica, which is index matched to the inner cladding of the double-clad fiber. Fused silica has refractive index 1.45088 at 980 nm. Therefore, the critical angle for TIR at the coupler's reflecting surface is 43.57 degrees. The launching angle can be chosen between 78 degrees and 90 degrees, 84 degrees is selected. For the front coupler, the angle of incidence to the TIR "slope" is 48 degrees, assuming the pump is coming in perpendicularly to the fiber. Assuming a fiber thickness of 50 to 60 microns, the width of the beam should be 40 or 50 microns. This yields 15.6 to 12.5 milliradians of divergence angle, which is below 1 degree. For the geometric consideration, the length of the prism on the attaching face is set to be 1.7 mm. If backside coupling were used with the same set of fiber parameters, the refractive index would need to be higher for a launch angle of 84 degrees. Fused silica cannot be used for the fiber or coupler and is replaced with Schott LLF2, having n=1.528987.

Figure 7:
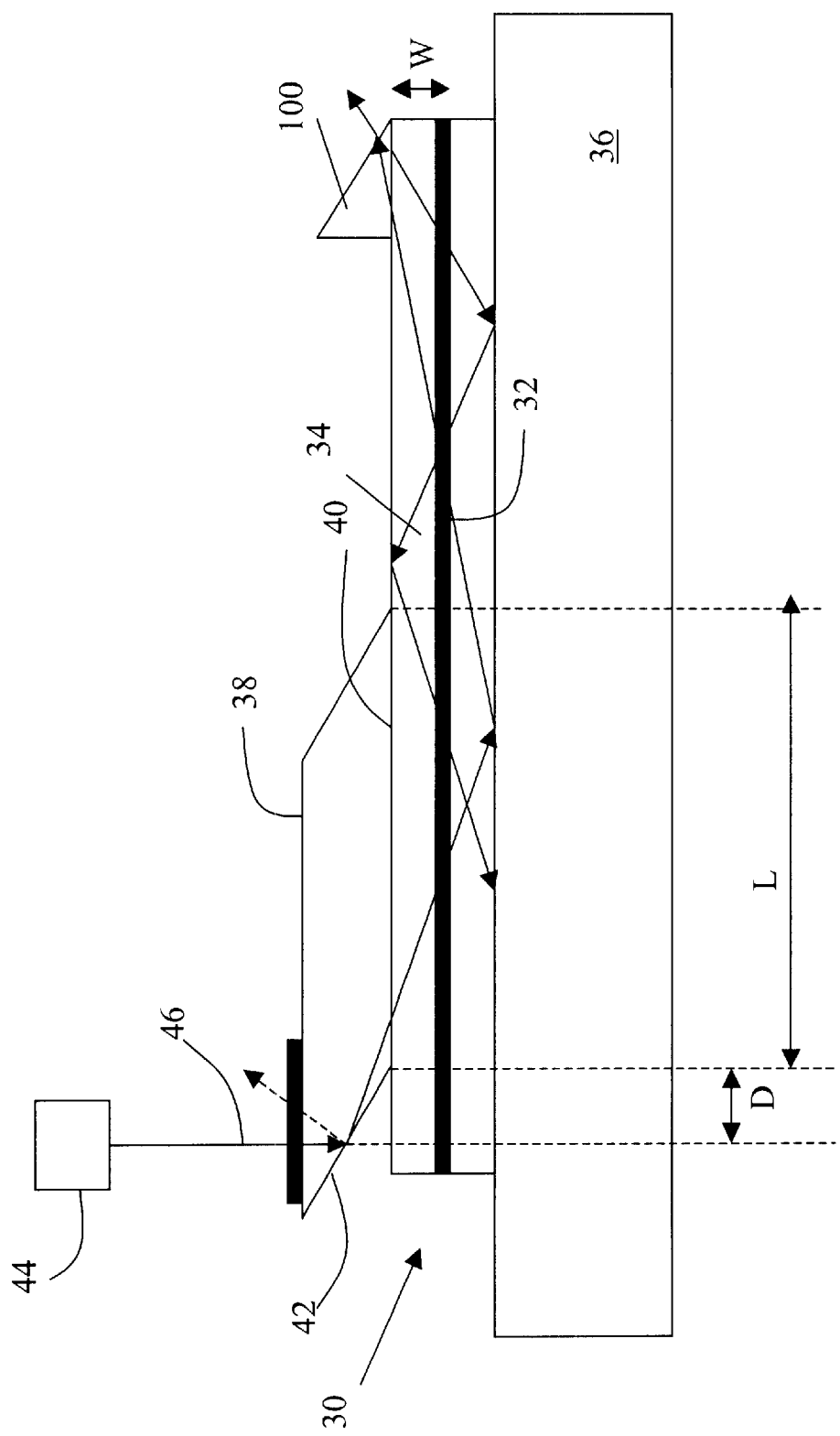
FIG. 7 is a sectional view of an active gain media further including a pair of tapered sections for dumping and recycling pump energy.

A significant portion of the pump energy is not absorbed in the active core. For a number of reasons including pumping efficiency, isolation from the telecomm fiber and safety, this pump energy should be dumped-and preferably recycled. As shown in FIG. 7, both goals can be achieved by mounting one or more TIR couplers 100 at or near the end of the active fiber. The couplers collect a high percentage of the pump energy, which is either dumped or recycled back through the fiber. The amount recycled will depend on the skew of the pump light. The recycling efficiency can be improved by forming the coupler's reflecting surface with a curvature that takes the incident skew light and refocuses it back into the fiber's inner cladding.

Figure 8A:
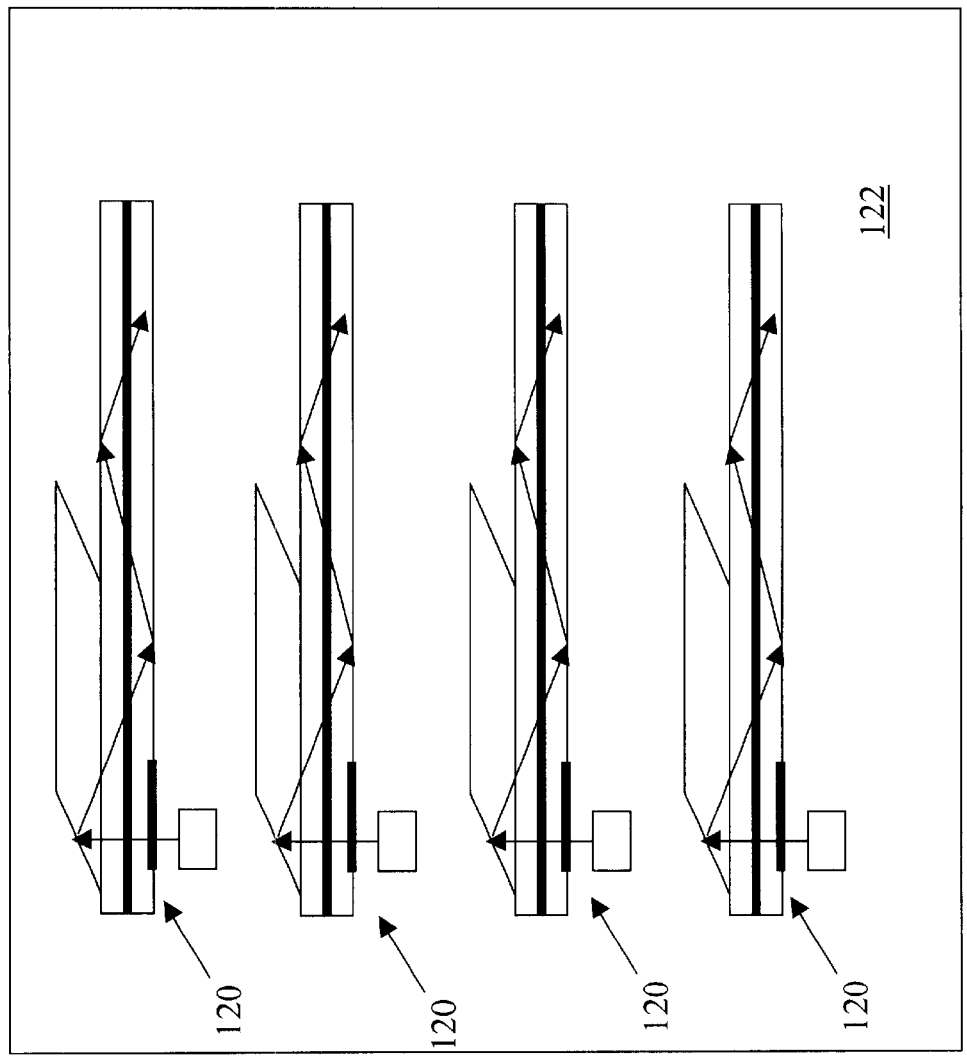
FIGS. 8a and 8b are schematic illustrations of various array configurations.

Many applications call for an array of amplifiers or lasers. One approach is to simply duplicate the single channel configurations 120 on a common substrate 112 as discussed above, which is depicted in FIG. 8a. An alternate approach is to devise a coupling scheme that allows the entire array to be pumped by a single source, which could be significantly less expensive to implement.

Figure 8B:
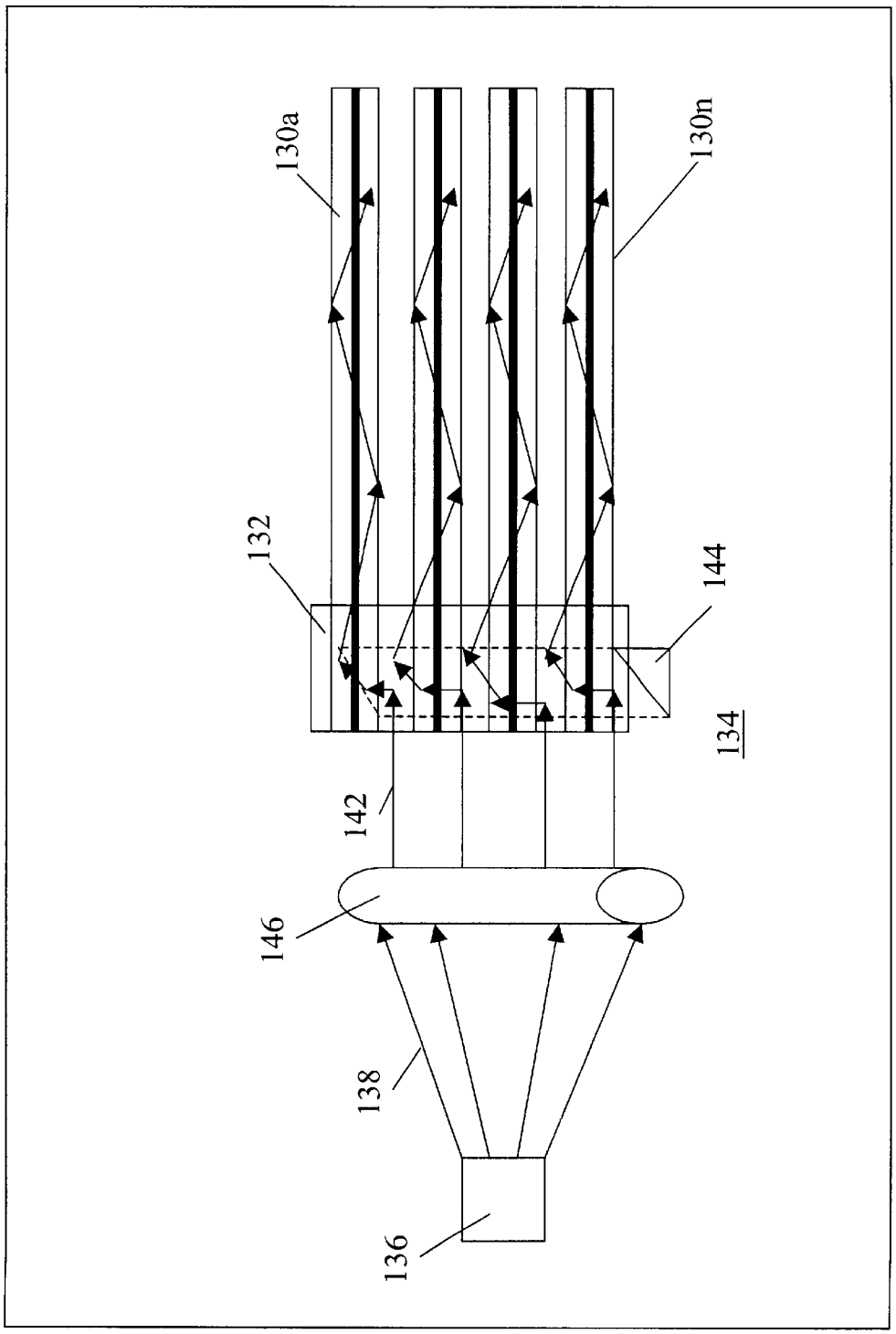

As shown in FIG. 8b, an array of fibers 130a–130n and a shared TIR coupler 132 are mounted on a common substrate 134. A single pump laser 136 is arranged to direct a pump beam 138 through a cylindrical lens 140 to form a sheet beam 142. In this particular configuration, sheet beam 142 is reflected off of a turning mirror 144 onto shared TIR coupler 132, which couples the beam into the respective fibers. The difficulty in this approach is in creating a sheet beam having a substantially uniform energy profile in order to pump the fibers in a substantially uniform manner.

As mentioned previously, the TIR coupler will find particular application in both ultra short length fiber amplifiers and fiber lasers. Coupling efficiency together with the simplicity and robustness of the coupler directly impact the overall performance and cost of those components. Furthermore, the TIR coupler facilitates the use of a multi-mode laser, which can be much cheaper than its single-mode counterparts. In the case of fiber amplifiers, the ability to side-couple the pump is particularly valuable because the optical signal is coupled to both ends of the fiber. This eliminates the need for a WDM coupler at the input.

Figure 9A:
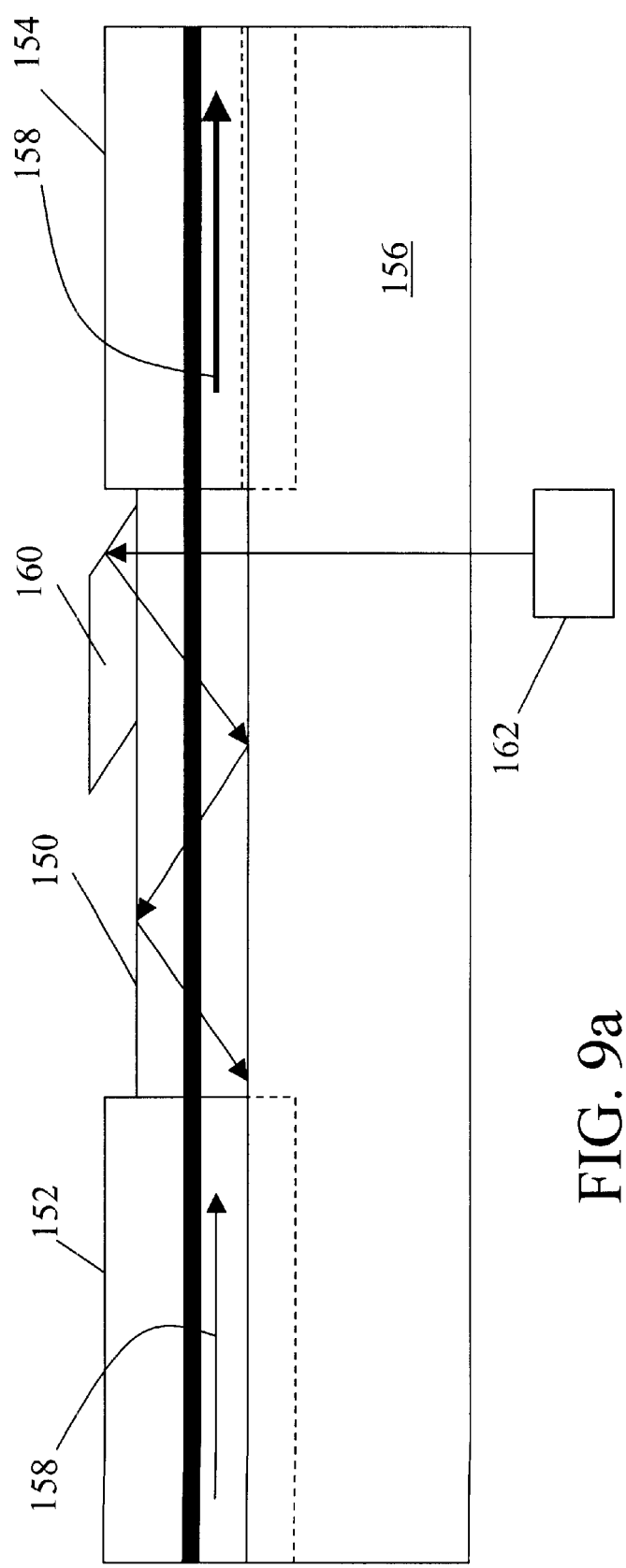
FIGS. 9a and 9b are schematic illustrations of representative fiber amplifiers using TIR couplers.
Figure 9B:
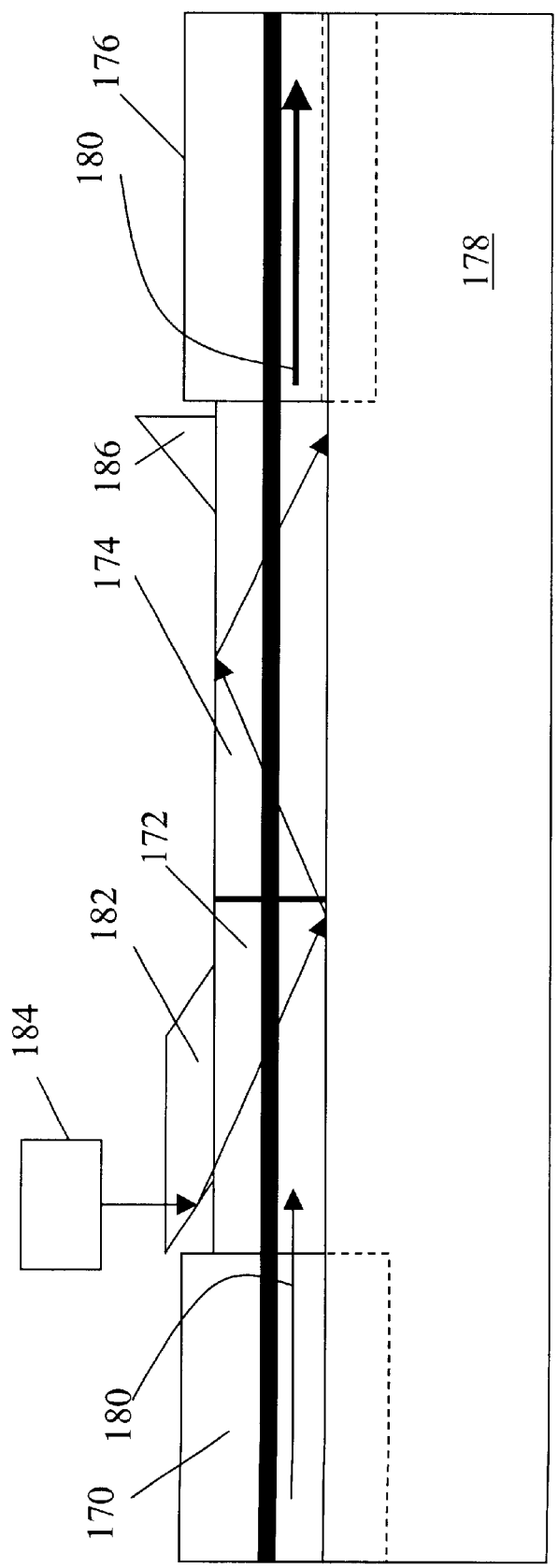

FIGS. 9a and 9b illustrate different embodiments of a fiber amplifier. As shown in FIG. 9a, an active fiber 150 is optically coupled to an input telecomm fiber 152 and an output telecomm fiber 154 on a substrate 156. An optical signal 158 passes through telecomm fiber 152, is amplified in active fiber 150 and coupled into output telecomm fiber 154. This particular configuration uses the backside-pumping scheme to minimize the length of the unpumped region. To further minimize the negative effects of the unpumped region of active fiber 150, the TIR coupler 160 and pump 162 are placed at the end of active fiber 150 adjacent output telecomm fiber 154 so that the active fiber is pumped backwards. The co-propagating pump 162 is preferably oriented substantially normal to the fiber either on the substrate adjacent the fiber or above or below the fiber.

As shown in FIG. 9b, an input telecomm fiber 170, passive fiber 172, active fiber 174 and an output telecomm fiber 176 are optically coupled together in that order on a substrate 178. An optical signal 180 passes through telecomm fiber 170 and passive fiber 172, amplified in active fiber 174 and coupled into output telecomm fiber 176. This particular configuration uses the front side pumping scheme to maximize the angle of incidence and avoid passing the pump beam through the substrate. The TIR coupler 182 and pump 184 are mounted on passive fiber 172 and couple the pump light into the passive fiber as described previously. A second coupler 186 is mounted at the end of active fiber 174 to dump and recycle pump light. Pump 172 is preferably oriented substantially normal to the fiber either on the substrate adjacent the fiber or above or below the fiber.

As illustrated in both amplifier examples, the pump is preferable positioned so that the beam of pump light is a substantially normal to the fiber. This has a number of beneficial effects. First, the AR coatings can be very simple and inexpensive because the angle of incidence is almost zero. Second, the working distance between the pump optics and the coupler can be minimized and the diameter of the optics is not overly constrained, hence a multi-mode pump laser can be used.

In a particular ultra short length amplifier embodiment, the active fiber is formed from a multi-component glass that is highly doped with rare-earth dopants such as erbium and preferably co-doped with erbium and ytterbium. Multi-component glasses can provide more sites for hosting rare-earth dopants thereby producing more gain per unit length of fiber without clustering problems.

Multi-component glasses contain one or more glass network formers ($P_2O_5$ phosphate, $SiO_2$ silicate, $GeO_2$ germanate, $TeO_2$ tellurite, $B_2O_3$ borate), one. or more glass network modifiers (alkaline metal oxides such as $K_2O$, $Na_2O$, $Li_2O$, $Rb_2O$; and alkaline-earth oxides such as $BaO$, $CaO$, $MgO$, $Sro$, $ZnO$, $PbO$ and mixtures thereof) and one or more glass network intermediators ($Y_2O_3$, $La_2O_3$, $Al_2O_3$, $B_2O_3$ and mixtures thereof). The modifier modifies the glass network, thereby reducing its melting temperature and creating additional dopant sites. The intermediator bridges some of the bonds in the network thereby increasing the network's strength and chemical durability without raising the melting temperature appreciably. The multi-component glasses of interest thus have a much lower softening temperature than silica ($SiO_2$), which greatly simplifies processing. The modified network provides many more sites for hosting high concentrations of rare-earth dopants without clustering problems. The modifier can be at least 5% and typically 15% by weight and the intermediator can be at least 2% and typically 10% by weight of the multi-component glass. The fiber core is then doped with high concentrations of rare-earth dopants such as erbium or co-doped with, for example; erbium and ytterbium. The cladding layer(s) are typically suitably undoped.

A specific example of a multi-component glass comprises a phosphate glass host that includes the following ingredients by weight percentages: $P_2O_5$ from 30 to 80 percent, $Er_2O_3$ from 1.5 to 12 percent, $L_2O_3$ from 5 to 30 percent, and MO from 5 to 30 percent, where $L_2O_3$ is selected from the transition metal oxide group consisting of $Al_2O_3$, $B_2O_3$, $Y_2O_3$, $La_2O_3$ and mixtures thereof, and MO is selected from the alkaline earth oxide group consisting of BaO, BeO, MgO, SrO, CaO, ZnO, PbO and mixtures thereof. The phosphate glass composition improves the solubility to erbium ions thereby allowing higher erbium dopant levels than previously deemed practical without raising the upconversion rate. In one particular embodiment, the phosphate glass host is alkaline free glass.

To achieve even higher gains per unit length, this embodiment may further comprise up to 30 percent by weight of $Yb_2O_3$. Preferably, the sum of weight percentages of $Yb_2O_3$ and $Er_2O_3$ is at least 2.5 percent. The glass composition described above also provides a high solubility to ytterbium ions, which facilitates elevated Yb doping levels. The elevated ytterbium levels in particular greatly enhance the fiber's ability to absorb pump power while the elevated erbium levels enhance the gain per unit length of the fiber. Together these attributes provide greater than 1.0 dB per cm gain over a desired bandwidth, e.g. the telecomm C-band from 1530–1565 nm, with a very short fiber (5 to 100 mm), a less expensive scheme of using a low power multi-mode pump to pump a single-mode fiber. To absorb sufficient power with the single-mode fiber from a multi-mode pump, the Yb levels is preferably greater than 5% by weight.

Figure 10:
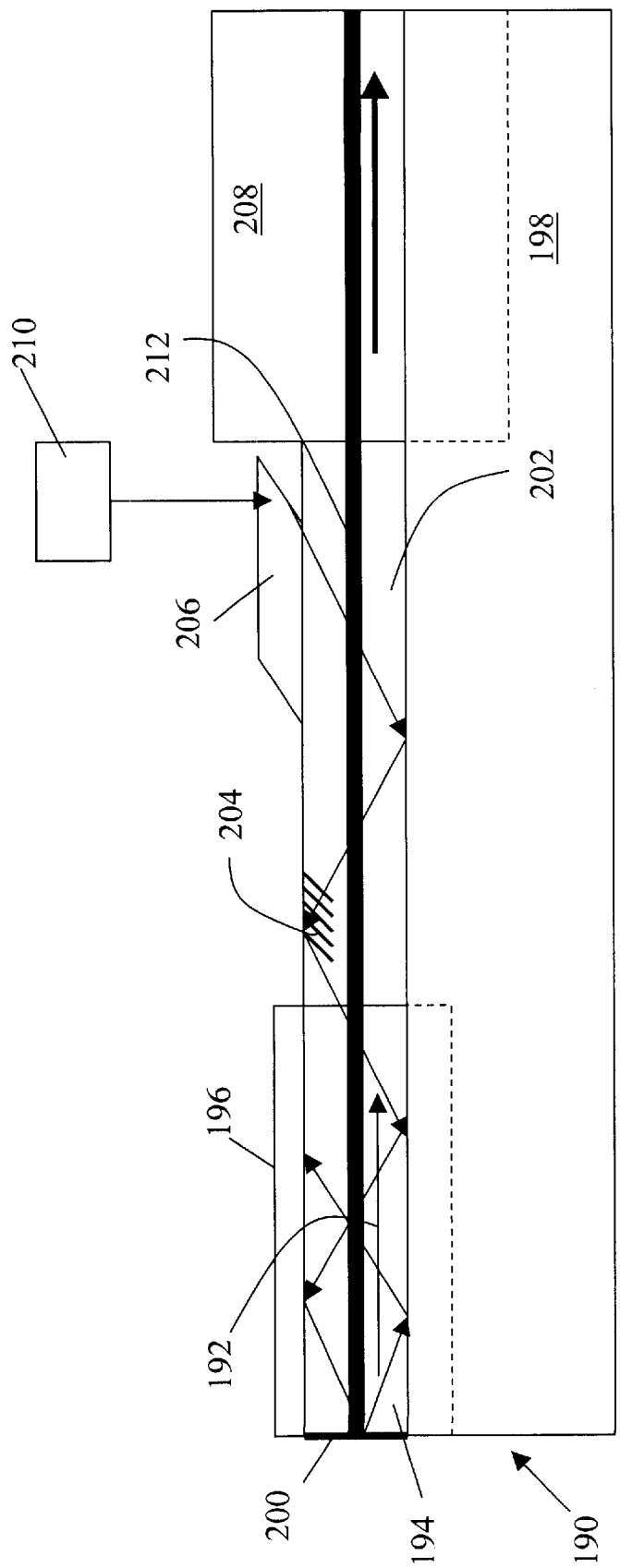
FIG. 10 is a schematic illustration of a representative fiber laser using a TIR coupler.

FIG. 10 illustrates the use of the TIR coupler to pump a fiber laser. A segment of active fiber 190 having a doped core 192, inner cladding 194.and outer cladding 196 is mounted on a substrate 198. A broadband reflector 200 is positioned on the far end of the fiber and covers at least the core and inner cladding area. A segment of passive fiber 202 is mounted on the substrate and optically coupled to the near end of active fiber 190. A grating 204 is written onto passive fiber 202 near the junction of the active and passive fibers. Grating 204 and reflector 200 define the laser cavity. A TIR coupler 206 is mounted on the passive fiber outside the cavity. A telecomm fiber 208 is mounted on the substrate and optically coupled to the free end of passive fiber 202.

A pump 210 injects pump light into TIR coupler 206, which couples the light through the passive fiber into the cavity. The pump light excites the doped core 192, which produces a preferential gain curve. The preferential gain in combination with the feedback provided by the cavity causes the active fiber to lase and output an optical signal 212 that is passed through to the telecomm fiber 208.

To achieve single-mode performance, the laser cavity must be ultra-short, less than approximately 2 cm. To produce a high output power, the gain must be much higher than is available in conventional active fibers and the pump coupling more efficient. An active fiber that satisfies these criteria is a phosphate glass host that includes the following ingredients by weight percentages: $P_2O_5$ from 30 to 80 percent, $Er_2O_3$ from 0.5 to 5 percent, $Yb_2O_3$ from 0.5 to 5 percent (single-mode pumped) or 5 to 30 percent (multi-mode pumped), $L_2O_3$ from 5 to 30 percent, and MO from 5 to 30 percent, where $L_2O_3$ is selected from the transition metal oxide group consisting of $Al_2O_3$, $B_2O_3$, $Y_2O_3$, $La_2O_3$ and mixtures thereof, and MO is selected from the alkaline earth oxide group consisting of BaO, BeO, MgO, SrO, CaO, ZnO, PbO and mixtures thereof. The phosphate glass composition improves the solubility to erbium and ytterbium ions thereby allowing higher dopant levels than previously deemed practical without raising the upconversion rate. The capability to multi-mode pump a single-mode fiber laser is an unexpected but welcome result. Multi-mode pumps are less expensive and higher power than single-mode pumps and ideally suited for use with the TIR coupler. Typically the fiber length is increased to accommodate clad pumping. Because the phosphate glass host supports doping concentrations, particularly the Ytterbium concentration, at levels well above those deemed practical by conventional wisdom, the active fiber is able to absorb enough pump power to produce output power levels in excess of 10 mW at a single wavelength.

While several illustrative embodiments of the invention have been shown and described, numerous variations and alternate embodiments will occur to those skilled in the art. For example, although the TIR coupler was described in the context of fiber applications it is equally applicable to planar waveguides in which the cladding layer or slab is transparent at the pump wavelength. The term fiber should therefore be considered to be synonymous with waveguide for purposes of interpreting the attached claims. Such variations and alternate embodiments are contemplated, and can be made without departing from the spirit and scope of the invention as defined in the appended claims.

We claim:

1. A pump coupler for use in an amplifier or laser, comprising:

A fiber having a core and an inner cladding with at least one flat surface; and

A total internal reflection (TIR) coupler in optical contact with the inner cladding's flat surface for a length L and having a reflecting surface that forms an angle of taper α with said inner cladding, said TIR coupler being effective to reflect pump light at a preselected angle of incidence $\theta_{inc}$ for the principal ray and satisfy a TIR condition at its reflecting surface for folding pump light into the fiber, wherein said pump light also satisfies a TIR condition for guiding pump light inside the inner cladding.

2. The pump coupler of claim 1, wherein the TIR coupler is further characterized by an input coupling condition for efficiently input coupling the pump light into the fiber and an output coupling condition for avoiding output coupling pump light back out of the fiber, the length L of the TIR coupler being effective to satisfy the input and output coupling conditions.

3. The pump coupler of claim 2, wherein the TIR coupler is effective to receive pump light substantially normal to the fiber so that the angle of incidence $\theta_{inc}$ at the reflecting surface is substantially equal to the angle of taper α.

4. The pump coupler of claim 3, wherein said inner cladding has a diameter W, the refractive indices of the TIR coupler, the inner cladding and an outer cladding are $n_{coupler}$, $n_{clad}$ and $n_{ext}$ respectively, and said pump light is incident on the reflecting surface a distance D from the starting point of the taper as projected onto the fiber, said folding and guiding TIR conditions and said input and output coupling conditions being as follows:

$$\alpha > \arcsin(1/n_{coupler}) \quad (1)$$
$$\theta_L > \arcsin(n_{ext}/n_{clad}) \quad (2)$$
$$\|D\|/\cos(\theta_i) < L \quad (3)$$
$$L < \|D\|/\cos(\theta_i) + 2W\tan(\theta_L) \quad (4)$$

where $\theta_i$ is an angle of incidence of pump light at the interface of the TIR coupler and inner cladding and $\theta_L$ is a launch angle of pump light into the fiber.

5. The pump coupler of claim 3, wherein said pump light has a beam width d, which modifies the input and output coupling conditions as follows:

$$(\|D\| + d/2)/\cos(\theta_i) < L \quad (3)'$$
$$L < (\|D\| - d/2)/\cos(\theta_i) + 2W\tan(\theta_L) \quad (4)'$$

where d satisfies an additional condition:

$$d < 2W\tan(\theta_L)\cos(\theta_i) \quad (5).$$

6. The pump coupler of claim 4, wherein said TIR coupler and said inner cladding are index matched so that $n_{coupler}=n_{clad}$ and $\theta_L=\theta_i$.

7. The pump coupler of claim 4, wherein said TIR coupler is mounted on said inner cladding towards one end of the fiber, said inner cladding having a second flat surface towards the other end of the fiber, further comprising a second TIR coupler in optical contact with the second flat surface to partially dump and partially recycle pump light that has traveled through the fiber.

8. The pump coupler of claim 4, wherein said fiber includes a segment of passive fiber having an undoped core surrounded by the inner cladding, which is optically coupled to a segment of active fiber having a doped core surrounded by the inner cladding, said TIR coupler being mounted on said passive fiber to fold the pump light into said segment of passive fiber and guide the pump light through and excite the entire length of the doped core in the segment of active fiber.

9. The pump coupler of claim 8, wherein the passive and active fibers comprise a phosphate glass including by weight percentages, $P_2O_5$ from 30 to 80 percent, $L_2O_3$ from 5 to 30 percent, MO from 5 to 30 percent, wherein $L_2O_3$ is selected from the transition metal oxide group consisting of $Al_2O_3$, $B_2O_3$, $Y_2O_3$, $La_2O_3$, and mixtures thereof, and MO is selected from the alkaline earth oxide group consisting of BaO, BeO, MgO, SrO, CaO, ZnO, PbO and mixtures thereof, and wherein the active fiber's doped core is doped with $Er_2O_3$ from 1.5 to 12 weight percent, and $Yb_2O_3$ from 0.5 to 30 weight percent.

10. The pump coupler of claim 9, wherein the TIR coupler is effective to reflect multi-mode pump light, the active fiber's doped core being doped with $Yb_2O_3$ from 5 to 30 weight percent.

11. The pump coupler of claim 4, further comprising a substrate on which the fiber is mounted, said TIR coupler's angle of taper α is an interior angle substantially equal to $\theta_i/2$, said pump light originating from the back side of said substrate so that the pump light traverses through the substrate and the fiber prior to illuminating the TIR coupler's reflecting surface at an angle of incidence $\theta_{inc}$ substantially equal to $\theta_i/2$.

12. The pump coupler of claim 11, further comprising an anti-reflection coating on the backside-of the substrate in the path of the pump light.

13. The pump coupler of claim 12, wherein the angle of incidence of the pump light on the anti-reflection coating is substantially zero.

14. The pump coupler of claim 4, wherein said TIR coupler's angle of taper α is an exterior angle that is substantially equal to $(\pi-\theta_i)/2$, said pump light originating from the same side of the fiber as the TIR coupler so that the pump light illuminates the TIR coupler's reflecting surface at an angle of incidence $\theta_{inc}$ substantially equal to $(\pi-\theta_i)/2$.

15. The pump coupler of claim 14, wherein said TIR coupler has a second surface substantially parallel to said fiber, further comprising an anti-reflection coating on said second surface in the path of the pump light.

16. The pump coupler of claim 15, wherein the angle of incidence of the pump light on the anti-reflection coating is substantially zero.

17. The pump coupler of claim 4, wherein the fiber's core is undoped so that the pump light is folded into the fiber in an undoped region.

18. The pump coupler of claim 1, further comprising a plurality of said fibers, each fiber having a core and an inner cladding with at least one flat surface, said TIR coupler being mounted on the fibers' flat surfaces and effective to fold pump light into each of said fibers simultaneously.

19. An active gain media for use in an amplifier or laser, comprising:

A passive fiber having an undoped core and an inner cladding with at least one flat surface;

An active fiber optically coupled to said passive fiber, said active fiber having a doped core formed of an active media and an inner cladding; and A total internal reflection (TIR) coupler in optical contact with the flat surface in the passive fiber for a length L and having a reflecting surface that forms an angle of taper α with said passive fiber, said TIR coupler being effective to reflect pump light at a preselected angle of incidence $\theta_{inc}$ for the principal ray and satisfy a TIR condition at its reflecting surface for folding pump light into the passive fiber, wherein said pump light also satisfies TIR conditions for guiding pump light inside both the passive and active fibers' inner claddings, said pump light interacting with the entire length of the active fiber's doped core to excite the active media and provide gain to an optical signal in said doped core.

20. The active gain media of claim 19, wherein the TIR coupler is further characterized by an input coupling condition for efficiently input coupling the pump light into the fiber and an output coupling condition for avoiding output coupling pump light back out of the fiber, the length L of the TIR coupler being effective to satisfy the input and output coupling conditions.

21. The active gain media of claim 20, wherein the TIR coupler is effective to receive pump light substantially normal to the fiber so that the angle of incidence $\theta_{inc}$ at the reflecting surface is substantially equal to the angle of taper α.

22. The active gain media of claim 21, wherein said inner cladding has a diameter W, the refractive indices of the TIR coupler, the inner cladding of the active fiber and an outer cladding around its doped core are $n_{coupler}$, $n_{clad}$ and $n_{ext}$ respectively and said pump light is incident on the reflecting surface a distance D from the starting point of the taper as projected onto the fiber, said folding and guiding TIR conditions and said input and output coupling conditions being as follows:

| | |
|---|---|
| $\alpha > \arcsin(1/n_{coupler})$ | (1) |
| $\theta_L > \arcsin(n_{ext}/n_{clad})$ | (2) |
| $\|D\|/\cos(\theta_i) < L$ | (3) |
| $L < \|D\|/\cos(\theta_i) + 2W\tan(\theta_L)$ | (4) | where $\theta_i$ is an angle of incidence of pump light at the interface of the TIR coupler and inner cladding of the passive fiber and $\theta_L$ is a launch angle of pump light into the active fiber.

23. The active gain media of claim 22, wherein said pump light has a beam width d, which modifies the input and output coupling conditions as follows:

| | |
|---|---|
| $(\|D\| + d/2)/\cos(\theta_i) < L$ | (3)' |
| $L < (\|D\| - d/2)/\cos(\theta_i) + 2W\tan(\theta_L)$ | (4)' | where d satisfies an additional condition:

| | |
|---|---|
| $d < 2W\tan(\theta_L)\cos(\theta_i)$ | (5). |

24. The active gain media of claim 22, wherein the inner claddings of the passive and active fiber and the TIR coupler are index matched so that $n_{coupler}=n_{clad}$ and $\theta_L=\theta_i$.

25. The active gain media of claim 22, wherein said active fiber has at least one flat surface towards the end of the active fiber that is not coupled to the passive fiber, further comprising a second TIR coupler in optical contact with the flat surface on the active fiber to partially dump and partially recycle pump light that has traveled through the active fiber.

26. The active gain media of claim 22, wherein said TIR coupler's angle of taper α is an exterior angle that is substantially equal to $(\pi-\theta_i)/2$, said pump light originating from the same side of the passive fiber as the TIR coupler so that the pump light illuminates the TIR coupler's reflecting surface at an angle of incidence $\theta_{inc}$ substantially equal to $(\pi-\theta_i)/2$.

27. The active gain media of claim 19, wherein the passive and active fibers comprise a phosphate glass including by weight percentages, $P_2O_5$ from 30 to 80 percent, $L_2O_3$ from 5 to 30 percent, MO from 5 to 30 percent, wherein $L_2O_3$ is selected from the transition metal oxide group consisting of $Al_2O_3$, $B_2O_3$, $Y_2O_3$, $La_2O_3$, and mixtures thereof, and MO is selected from the alkaline earth oxide group consisting of BaO, BeO, MgO, SrO, CaO, ZnO, PbO and mixtures thereof, and wherein the active fiber's doped core is doped with $Er_2O_3$ from 1.5 to 12 weight percent, and $Yb_2O_3$ from 0.5 to 30 weight percent.

28. The active gain media of claim 27, wherein the TIR coupler is effective to reflect multi-mode pump light, the active fiber's doped core being doped with $Yb_2O_3$ from 5 to 30 weight percent.

29. A fiber amplifier, comprising:

An input port for receiving an optical signal;

A passive phosphate glass fiber having an undoped core and an inner cladding around said core with at least one flat surface that together confine the optical signal to propagate through the undoped core;

An active phosphate glass fiber optically coupled to said passive fiber, said active fiber having a core co-doped with Erbium and Ytterbium and an inner cladding that together confine the optical signal to propagate through the doped core;

A total internal reflection (TIR) coupler in optical contact with and index matched to said passive fiber for a length L along the flat surface of the passive fiber's inner cladding and having a reflecting surface that forms an angle of taper $\alpha$ with said inner cladding; and A pump source positioned to inject pump light substantially normal to the passive fiber and onto the TIR coupler's reflecting surface at an angle of incidence $\theta_{inc}$, for the principal ray, said TIR coupler being effective to reflect the principal ray of the pump light and satisfy a TIR condition at its reflecting surface and input and output coupling conditions at an interface between the TIR coupler and the inner cladding for folding pump light into the passive fiber, wherein said pump light also satisfies TIR conditions for guiding pump light inside both the passive and active fibers' inner claddings, said pump light interacting with the entire length of the active fiber's co-doped core to excite the active media and provide gain to the optical signal.

30. The fiber amplifier of claim 29, wherein said inner cladding has a diameter W, the refractive indices of the TIR coupler, the inner cladding of the active fiber and an outer cladding around its co-doped core are $n_{coupler}$, $n_{clad}$ and $n_{ext}$ respectively, and said pump source is positioned a distance D from the starting point of the taper as projected onto the fiber, said folding and guiding TIR conditions and said input and output coupling conditions being as follows:

$$\alpha > \arcsin(1/n_{coupler}) \quad (1)$$
$$\theta_L > \arcsin(n_{ext}/n_{clad}) \quad (2)$$
$$\|D\|/\cos(\theta_i) < L \quad (3)$$
$$L < \|D\|/\cos(\theta_i) + 2W\tan(\theta_L) \quad (4)$$

where $\theta_i$ is an angle of incidence of pump light at the interface of the TIR coupler and inner cladding of the passive fiber and $\theta_L$ is a launch angle of pump light into the active fiber.

31. The fiber amplifier of claim 30, wherein said pump light has a beam width d, which modifies the input and output coupling conditions as follows:

$$(\|D\| + d/2)/\cos(\theta_i) < L \quad (3)'$$
$$L < (\|D\|-d/2)/\cos(\theta_i) + 2W\tan(\theta_L) \quad (4)'$$

where d satisfies an additional condition:

$$d < 2W\tan(\theta_L)\cos(\theta_L) \quad (5).$$

32. The fiber amplifier of claim 31, wherein the inner claddings of the passive and active fiber and the TIR coupler are index matched so that $n_{coupler}=n_{clad}$ and $\theta_L=\theta_i$.

33. The fiber amplifier of claim 30, wherein said TIR coupler's angle of taper $\alpha$ is an exterior angle that is substantially equal to $(\pi-\theta_i)/2$, said pump source being positioned on the same side of the passive fiber as the TIR coupler so that the pump light illuminates the TIR coupler's reflecting surface at an angle of incidence $\theta_{inc}$ substantially equal to $(\pi-\theta_i)/2$.

34. The fiber amplifier of claim 29, wherein the passive and active phosphate glass fibers comprise by weight percentages, $P_2O_5$ from 30 to 80 percent, $L_2O_3$ from 5 to 30 percent, MO from 5 to 30 percent, wherein $L_2O_3$ is selected from the transition metal oxide group consisting of $Al_2O_3$, $B_2O_3$, $Y_2O_3$, $La_2O_3$, and mixtures thereof, and MO is selected from the alkaline earth oxide group consisting of BaO, BeO, MgO, SrO, CaO, ZnO, PbO and mixtures thereof, and wherein the active fiber's doped core is doped with $Er_2O_3$ from 1.5 to 12 weight percent, and $Yb_2O_3$ from 0.5 to 30 weight percent.

35. The fiber amplifier of claim 34, wherein the pump source is a multi-mode pump source and the active fiber's doped core is doped with $Yb_2O_3$ from 5 to 30 weight percent.

36. A method for side coupling pump light into a fiber, comprising:

Providing a fiber having a core and an inner cladding with at least one flat surface;

Mounting a total internal reflection (TIR) coupler in optical contact with the inner cladding's flat surface for a length L, said TIR coupler having a reflecting surface that forms an angle of taper $\alpha$ with said inner cladding; and Directing pump light onto said TIR coupler at a preselected angle of incidence $\theta_{inc}$ for the principal ray, said TIR coupler being effective to satisfy a TIR condition at its reflecting surface for folding pump light into the fiber so that said pump light also satisfies a TIR condition for guiding pump light inside the inner cladding.

37. The method of claim 36, wherein the TIR coupler is further characterized by an input coupling condition for efficiently input coupling the pump light into the fiber and an output coupling condition for avoiding output coupling pump light back out of the fiber, the method further comprising preselecting the length L of the TIR coupler to be effective to satisfy the input and output coupling conditions.

38. The method of claim 37, further comprising directing the pump light substantially normal to the fiber so that the angle of incidence $\theta_{inc}$ at the reflecting surface is substantially equal to the angle of taper $\alpha$.

39. The method of claim 38, wherein said inner cladding has a diameter W, the refractive indices of the TIR coupler, the inner cladding and an outer cladding are $n_{coupler}$, $n_{clad}$ and $n_{ext}$ respectively, and said pump light is incident on the reflecting surface a distance D from the starting point of the taper as projected onto the fiber, further comprising preselecting the TIR Coupler's angle of taper $\alpha$ and length L satisfy the folding and guiding TIR conditions and said input and output coupling conditions given as follows:

| | |
|---|---|
| $\alpha > \arcsin(1/n_{coupler})$ | (1) |
| $\theta_L > \arcsin(n_{ext}/n_{clad})$ | (2) |
| $\lVert D \rVert /\cos(\theta_i) < L$ | (3) |
| $L < \lVert D \rVert /\cos(\theta_i) + 2W\tan(\theta_L)$ | (4) | where $\theta_i$ is an angle of incidence of pump light at the interface of the TIR coupler and inner cladding and $\theta_L$ is a launch angle of pump light into the fiber.

40. The method of claim 39, wherein said pump light has a beam width d, further comprising preselecting the TIR Coupler's angle of taper $\alpha$ and length L to satisfy the modified input and output coupling conditions given as follows:

| | |
|---|---|
| $(\lVert D \rVert + d/2)/\cos(\theta_i) < L$ | (3)' |
| $L < (\lVert D \rVert - d/2)/\cos(\theta_i) + 2W\tan(\theta_L)$ | (4)' | where d satisfies an additional condition:

| | |
|---|---|
| $d < 2W\tan(\theta_L)\cos(\theta_i)$ | (5). |

41. The method of claim 39, further comprising index matching said TIR coupler and said inner cladding so that $n_{coupler}=n_{clad}$ and $\theta_L=\theta_i$.

42. The method of claim 36, wherein said TIR coupler is mounted on said inner cladding towards one end of the fiber, said inner cladding having a second flat surface towards the other end of the fiber, further comprising mounting a second TIR coupler in optical contact with the second flat surface to partially dump and partially recycle pump light that has traveled through the fiber.

43. The method of claim 36, wherein the step of providing said fiber includes:

providing a segment of passive fiber having an undoped core surrounded by the inner cladding;

providing a segment of active fiber having a doped core surrounded by the inner cladding; and optically coupling the segment of active fiber to the segment of passive fiber, said TIR coupler being mounted on said passive fiber to fold the pump light into said segment of passive fiber and guide the pump light through and excite the entire length of the doped core in the segment of active fiber.

44. The method of claim 43, wherein the steps of providing the passive and active fibers comprises:

Drawing the passive and active fibers from a phosphate glass including by weight percentages, $P_2O_5$ from 30 to 80 percent, $L_2O_3$ from 5 to 30 percent, MO from 5 to 30 percent, wherein $L_2O_3$ is selected from the transition metal oxide group consisting of $Al_2O_3$, $B_2O_3$, $Y_2O_3$, $La_2O_3$, and mixtures thereof, and MO is selected from the alkaline earth oxide group consisting of BaO, BeO, MgO, SrO, CaO, ZnO, PbO and mixtures thereof, and doping the active fiber's doped core with $Er_2O_3$ from 1.5 to 12 weight percent, and $Yb_2O_3$ from 0.5 to 30 weight percent.

45. The method of claim 44, wherein the TIR coupler is effective to reflect multi-mode pump light, the active fiber's doped core being doped with $Yb_2O_3$ from 5 to 30 weight percent.

46. The method of claim 39, further comprising:

Mounting the fiber on a substrate;

Preselecting said TIR coupler's angle of taper $\alpha$ as an interior angle substantially equal to $\theta_i/2$; and Directing said pump light from the back side of said substrate so that the pump light traverses through the substrate and the fiber prior to illuminating the TIR coupler's reflecting surface at an angle of incidence $\theta_{inc}$ substantially equal to $\theta_i/2$.

47. The method of claim 39, comprising:

Preselecting said TIR coupler's angle of taper $\alpha$ as an exterior angle that is substantially equal to $(\pi-\theta_i)/2$; and Directing said pump light originating from the same side of the fiber as the TIR coupler so that the pump light illuminates the TIR coupler's reflecting surface at an angle of incidence $\theta_{inc}$ substantially equal to $(\pi-\theta_i)/2$.

48. The method of claim 36, further comprising:

Providing a plurality of said fibers, each fiber having a core and an inner cladding with at least one flat surface, and Mounting the TIR coupler on the fibers' flat surfaces to fold pump light into each of said fibers simultaneously.

* * * * *